US010030961B2

(12) United States Patent
Dzięcioł et al.

(10) Patent No.: US 10,030,961 B2
(45) Date of Patent: Jul. 24, 2018

(54) GAP MEASURING DEVICE (71) Applicant: General Electric Company, Schenectady, NY (US)

(72) Inventors: Piotr Krzysztof Dzięcioł, Warsaw (PL); Szymon Perkowski, Warsaw (PL); Jean-Marie Georges Joseph Deschamps, Belfort (FR)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 14/953,173

(22) Filed: Nov. 27, 2015

(65) Prior Publication Data
US 2017/0153103 A1 Jun. 1, 2017

(51) Int. Cl.
G01B 5/14 (2006.01)
G01B 3/30 (2006.01)

(52) U.S. Cl.
CPC ............ G01B 5/14 (2013.01); G01B 3/306 (2013.01)

(58) Field of Classification Search
CPC ............ G01B 5/14; G01B 7/14; G01B 7/312
USPC ................................. 33/567.1, 655
See application file for complete search history.

(56) References Cited

U.S. PATENT DOCUMENTS

| 213,809 | A | 1/1879 | Chinnock |
| 498,871 | A | 6/1893 | Ayton |
| 554,297 | A | 2/1896 | Olsen |
| 648,286 | A | 4/1900 | Overman et al. |
| 690,127 | A | 12/1901 | Alston |
| 719,092 | A | 1/1903 | Davis |
| 733,328 | A | 7/1903 | Mount |
| 749,006 | A | 1/1904 | Webb |
| 512,542 | A | 1/1906 | Beals |
| 839,803 | A | 1/1907 | Amsler |
| 868,358 | A | 10/1907 | Noyes |
| 997,609 | A | 7/1911 | Elmore |
| 1,074,724 | A | 10/1913 | Le Pontois |
| 1,127,808 | A | 2/1915 | Reynolds et al. |
| 1,213,804 | A | 1/1917 | Cahill |

(Continued)

FOREIGN PATENT DOCUMENTS

EP 0 039 621 A2 11/1981
EP 0 079 573 a1 5/1983

(Continued)

OTHER PUBLICATIONS

European Search Report and Opinion issued in connection with corresponding EP Application No. 6200624.1 dated Apr. 13, 2017.

Primary Examiner — Yaritza Guadalupe-McCall
(74) Attorney, Agent, or Firm — Nixon & Vanderhye P.C.

(57) ABSTRACT

A device for measuring a gap between two objects located remotely from a user includes a base, a slider and a wedge. The slider is slidably received in the base and the wedge is attached to the slider and also slidably received in the base. A push-pull cable has a proximal end connected to the slider. The wedge is inclined at a predetermined angle and slides along an angled surface of the base such that a force applied to a distal end of the cable causes an upper surface of the wedge to move vertically forcing the wedge and the base into respective contact with the two objects forming the gap. By measuring the distance that the push-pull cable slides, the vertical distance traveled by the wedge and thus a measurement of the gap may be determined.

20 Claims, 10 Drawing Sheets

(56) References Cited

U.S. PATENT DOCUMENTS

| | | | |
|---|---|---|---|
| 1,221,208 | A | 4/1917 | Neuland |
| 1,235,522 | A | 7/1917 | Le Pontois |
| 1,419,409 | A | 6/1922 | Potts |
| 1,425,145 | A | 8/1922 | Smith |
| 1,466,903 | A | 9/1923 | Howe |
| 1,515,882 | A | 11/1924 | Purdy |
| 1,593,824 | A | 7/1926 | Higgins |
| 1,604,693 | A | 10/1926 | Hecht et al. |
| 1,608,481 | A | 11/1926 | Field |
| 1,610,674 | A | 12/1926 | Hahnemann et al. |
| 1,612,026 | A | 12/1926 | Jannell |
| 1,630,645 | A | 5/1927 | Varley |
| 1,652,199 | A | 12/1927 | Hall |
| 1,682,564 | A | 8/1928 | Hill |
| 1,602,935 | A | 11/1928 | Heddon |
| 1,700,211 | A | 1/1929 | Anderson |
| 1,700,780 | A | 2/1929 | Tanner |
| 1,673,673 | A | 6/1929 | Girault |
| 1,723,110 | A | 8/1929 | Wirt |
| 2,310,635 | A | 2/1943 | Hopkins |
| 2,330,412 | A | 9/1943 | Dierking |
| 2,390,333 | A | 12/1945 | Scott, Jr. |
| 2,411,698 | A | 11/1946 | Somes |
| 2,419,280 | A | 4/1947 | Neff |
| 2,426,245 | A | 8/1947 | Skellett |
| 2,518,080 | A * | 8/1950 | Schury .................. G01B 3/306 33/567.1 |
| 2,553,285 | A | 5/1951 | Thomas |
| 2,584,922 | A | 2/1952 | Reid |
| 2,590,853 | A | 4/1952 | Fulton |
| 2,660,371 | A | 11/1953 | Campbell et al. |
| 2,696,947 | A | 12/1954 | Hauser et al. |
| 2,782,626 | A | 2/1957 | Jochum et al. |
| 2,867,909 | A * | 1/1959 | Keller .................. G01B 3/306 33/567.1 |
| 2,925,251 | A | 2/1960 | Arps |
| 3,077,731 | A | 2/1963 | Addie et al. |
| 3,173,043 | A | 3/1965 | Newill |
| 3,247,598 | A * | 4/1966 | Wilkes .................. F16H 25/183 33/567.1 |
| 3,321,558 | A | 5/1967 | Balamuth et al. |
| 3,395,815 | A | 8/1968 | Johnson |
| 3,490,697 | A | 1/1970 | Best, Jr. |
| 3,500,181 | A | 3/1970 | Jackson |
| 3,500,208 | A | 3/1970 | Wickersham, Jr. et al. |
| 35,000,079 | | 3/1970 | Barthalon |
| 3,512,310 | A | 5/1970 | Rudd et al. |
| 3,512,876 | A | 5/1970 | Marks |
| 3,525,216 | A | 8/1970 | Phillips |
| 3,526,318 | A | 9/1970 | Erickson |
| 3,537,312 | A | 11/1970 | Moore |
| 3,544,981 | A | 12/1970 | Gunther et al. |
| 3,547,778 | A | 12/1970 | Flaherty et al. |
| 3,638,323 | A * | 2/1972 | Groe .................. G01B 3/306 33/567.1 |
| 3,680,460 | A | 8/1972 | Starp |
| 3,718,353 | A | 2/1973 | Charcharos |
| 3,727,125 | A | 4/1973 | Mourier |
| 3,727,912 | A | 4/1973 | Vos |
| 3,777,192 | A | 12/1973 | Barrow |
| 3,816,015 | A | 6/1974 | Bilz et al. |
| 3,820,247 | A * | 6/1974 | Casey et al. ........... G01B 3/306 33/537 |
| 3,844,677 | A | 10/1974 | Evans et al. |
| 3,844,871 | A | 10/1974 | Habert et al. |
| 3,883,268 | A | 5/1975 | Evans et al. |
| 3,892,034 | A | 7/1975 | Arakelov et al. |
| 3,938,913 | A | 2/1976 | Isenberg et al. |
| 3,952,220 | A | 4/1976 | Staudt et al. |
| 4,004,442 | A | 1/1977 | Strelchenko et al. |
| 4,019,349 | A | 4/1977 | Kouklik |
| 4,036,034 | A | 7/1977 | Aisaka et al. |
| 4,072,108 | A | 2/1978 | Lewis et al. |
| 4,132,935 | A | 1/1979 | Gaus et al. |
| 4,148,236 | A | 4/1979 | Holøyen et al. |
| 4,168,574 | A * | 9/1979 | Chase .................. G01B 3/306 33/567.1 |
| 4,227,311 | A * | 10/1980 | Behney .................. A01L 11/00 33/195 |
| 4,239,971 | A | 12/1980 | Cushman |
| 4,244,229 | A | 1/1981 | Pullen |
| 4,327,894 | A | 5/1982 | Ewing et al. |
| 4,419,829 | A | 12/1983 | Miller |
| 4,419,830 | A | 12/1983 | Miller |
| 4,429,275 | A | 1/1984 | Cedrone |
| 4,509,010 | A | 4/1985 | Cedrone |
| 4,523,240 | A | 6/1985 | Dunstan et al. |
| 4,535,633 | A | 8/1985 | Schiess et al. |
| 4,563,769 | A | 1/1986 | Madsen |
| 4,669,728 | A | 6/1987 | Carden |
| 4,677,283 | A | 6/1987 | Lewis |
| 4,712,641 | A | 12/1987 | Chelminski |
| 4,794,838 | A | 1/1989 | Corrigau, III |
| 4,838,515 | A * | 6/1989 | Prentice .................. B23Q 1/48 33/1 M |
| 4,876,794 | A | 10/1989 | Myers |
| 4,893,511 | A | 1/1990 | Voigt et al. |
| 4,896,553 | A | 1/1990 | Sato et al. |
| 4,901,572 | A | 2/1990 | Suyama |
| 4,938,230 | A * | 7/1990 | Machek .................. A61B 1/24 33/514 |
| 4,961,636 | A | 10/1990 | Gaul et al. |
| 4,991,162 | A | 2/1991 | Tabe |
| 5,036,277 | A | 7/1991 | Van Der Walt |
| 5,183,236 | A | 2/1993 | Droulon |
| 5,319,917 | A | 6/1994 | Bothner et al. |
| 5,363,562 | A * | 11/1994 | Schmidt .................. G01B 3/306 33/567 |
| 5,377,002 | A | 12/1994 | Malin et al. |
| 5,386,338 | A | 1/1995 | Jordan et al. |
| 5,428,897 | A | 7/1995 | Jordan et al. |
| 5,469,828 | A | 11/1995 | Heimberg et al. |
| 5,520,154 | A | 5/1996 | Heimberg et al. |
| 5,752,427 | A | 5/1998 | Leutner |
| 5,804,507 | A | 9/1998 | Perlov et al. |
| 5,824,896 | A | 10/1998 | Lee |
| 5,949,401 | A | 9/1999 | Kazarian |
| 6,118,192 | A | 9/2000 | Karidis |
| 6,138,374 | A * | 10/2000 | Friedersdorf .......... G01B 5/066 269/74 |
| 6,141,862 | A | 11/2000 | Matsui et al. |
| 6,147,856 | A | 11/2000 | Karidis |
| 6,182,477 | B1 | 2/2001 | Shibata et al. |
| 6,191,561 | B1 | 2/2001 | Bartel |
| 6,224,339 | B1 | 5/2001 | Rhodes et al. |
| 6,252,496 | B1 | 6/2001 | Jackson |
| 6,270,309 | B1 | 8/2001 | Ghetzler et al. |
| 6,327,994 | B1 | 12/2001 | Labrador |
| 6,343,975 | B1 | 2/2002 | Mok |
| 6,412,272 | B1 | 7/2002 | Titterton, III et al. |
| 6,446,425 | B1 | 9/2002 | Lawlor |
| 6,464,467 | B2 | 10/2002 | Sullivan et al. |
| 6,524,475 | B1 | 2/2003 | Herrington et al. |
| 6,595,285 | B2 | 7/2003 | Dubois et al. |
| 6,615,665 | B1 | 9/2003 | Flögel et al. |
| 6,780,083 | B2 | 8/2004 | Ising et al. |
| 6,886,267 | B1 | 5/2005 | Karwowski et al. |
| 6,959,668 | B2 | 11/2005 | Schreiner et al. |
| 6,975,393 | B2 | 12/2005 | Mettes |
| 7,114,824 | B2 | 10/2006 | Picone |
| 7,258,696 | B2 | 8/2007 | Rabkin et al. |
| 7,410,297 | B2 | 8/2008 | Sundaram |
| 7,469,596 | B1 | 12/2008 | Bernardo et al. |
| D593,684 | S | 6/2009 | Kapadya |
| 7,665,222 | B2 | 2/2010 | Dall'Aglio |
| 7,674,123 | B1 | 3/2010 | Weber et al. |
| 7,777,682 | B2 | 8/2010 | Yagi |
| 7,919,907 | B2 | 4/2011 | Reichenbach et al. |
| 7,969,036 | B2 | 6/2011 | Chung |
| 8,006,691 | B2 | 8/2011 | Kenyon et al. |
| 8,035,372 | B2 | 10/2011 | Garneyer et al. |
| 8,091,418 | B2 | 1/2012 | Acker |
| 8,149,588 | B2 | 4/2012 | Sip |

(56) References Cited

U.S. PATENT DOCUMENTS

| | | |
|---|---|---|
| 8,294,290 B2 | 10/2012 | Da Silva |
| 8,403,864 B2 | 3/2013 | Tateishi et al. |
| 8,446,028 B2 | 5/2013 | Chung |
| 8,482,107 B2 | 7/2013 | Rokuhara et al. |
| 8,610,822 B2 | 12/2013 | Weber et al. |
| 8,646,416 B2 | 2/2014 | Hawkins et al. |
| 8,716,612 B2 | 5/2014 | Schön |
| 8,786,120 B2 | 7/2014 | Da Silva |
| 8,863,621 B2 | 10/2014 | Richardson |
| 8,959,785 B2 | 2/2015 | Craig et al. |
| RE45,396 E | 3/2015 | Müller et al. |
| 2001/0028602 A1 | 10/2001 | Dubois et al. |
| 2001/0029206 A1 | 10/2001 | Henry |
| 2001/0032884 A1 | 10/2001 | Ring et al. |
| 2001/0043878 A1 | 11/2001 | Sullivan et al. |
| 2001/0045909 A1 | 11/2001 | Eggleston |
| 2002/0000368 A1 | 1/2002 | Weichart |
| 2002/0122717 A1 | 9/2002 | Ghetzler et al. |
| 2002/0161377 A1 | 10/2002 | Rabkin |
| 2002/0167103 A1 | 11/2002 | Ickinger |
| 2003/0025419 A1 | 2/2003 | Leonov |
| 2003/0083686 A1 | 5/2003 | Freeman et al. |
| 2003/0085562 A1 | 5/2003 | Sparling |
| 2003/0163184 A1 | 8/2003 | Scheiner et al. |
| 2003/0190967 A1 | 10/2003 | Henry |
| 2003/0199225 A1 | 10/2003 | Ising et al. |
| 2003/0215345 A1 | 11/2003 | Holtzapple et al. |
| 2003/0228237 A1 | 12/2003 | Holtzapple et al. |
| 2004/0049220 A1 | 3/2004 | Boecker et al. |
| 2004/0079051 A1 | 4/2004 | Lippman et al. |
| 2004/0147939 A1 | 7/2004 | Rabkin et al. |
| 2004/0226424 A1 | 11/2004 | O'Banion et al. |
| 2005/0035484 A1 | 2/2005 | Meyer, III et al. |
| 2005/0243553 A1 | 11/2005 | Picone |
| 2006/0024130 A1 | 2/2006 | Loustanau et al. |
| 2006/0278023 A1 | 12/2006 | Garneyer et al. |
| 2007/0007771 A1 | 1/2007 | Biddle et al. |
| 2007/0106143 A1 | 5/2007 | Flaherty |
| 2007/0169482 A1 | 7/2007 | Weightman |
| 2007/0256507 A1 | 11/2007 | Morgan |
| 2008/0043925 A1 | 2/2008 | Sundaram |
| 2008/0161884 A1 | 7/2008 | Chandler et al. |
| 2008/0180339 A1 | 7/2008 | Yagi |
| 2009/0013551 A1 | 1/2009 | Dall'Aglio |
| 2009/0013773 A1 | 1/2009 | Acker |
| 2009/0015018 A1 | 1/2009 | Nail |
| 2009/0031574 A1* | 2/2009 | Waltz, Jr. ............... G01B 3/04 33/555.3 |
| 2009/0173677 A1 | 7/2009 | Seura |
| 2009/0206703 A1 | 8/2009 | Reichenbach et al. |
| 2009/0289459 A1 | 11/2009 | Chung |
| 2009/0295385 A1 | 12/2009 | Brazdeikis et al. |
| 2010/0003152 A1 | 1/2010 | Holtzapple et al. |
| 2010/0025387 A1 | 2/2010 | Arai et al. |
| 2010/0044526 A1 | 2/2010 | Weber et al. |
| 2010/0111669 A1 | 5/2010 | Hays et al. |
| 2010/0186400 A1 | 7/2010 | Preston et al. |
| 2010/0208860 A1 | 8/2010 | Petrovich |
| 2010/0333215 A1 | 12/2010 | Wang et al. |
| 2011/0018526 A1 | 1/2011 | Windmueller et al. |
| 2011/0048202 A1 | 3/2011 | Peterson et al. |
| 2011/0063813 A1 | 3/2011 | Sip |
| 2011/0079186 A1 | 4/2011 | Hawkins et al. |
| 2011/0133471 A1 | 6/2011 | Chung |
| 2011/0255000 A1 | 10/2011 | Weber et al. |
| 2011/0270701 A1 | 11/2011 | Black et al. |
| 2011/0278975 A1 | 11/2011 | Holcomb |
| 2011/0283705 A1 | 11/2011 | Oliver |
| 2012/0026482 A1 | 2/2012 | Dailey |
| 2012/0039733 A1 | 2/2012 | Smith et al. |
| 2012/0173197 A1 | 7/2012 | Craig et al. |
| 2012/0272792 A1 | 11/2012 | Richardson |
| 2013/0007935 A1 | 1/2013 | Chin et al. |
| 2013/0183660 A1 | 7/2013 | Yu et al. |
| 2013/0300060 A1 | 11/2013 | Kyrychenko |
| 2014/0023518 A1 | 1/2014 | O'Brien et al. |
| 2014/0047903 A1 | 2/2014 | Sakai |
| 2014/0048494 A1 | 2/2014 | Simmons, Jr. |
| 2014/0073884 A1 | 3/2014 | Yu et al. |
| 2014/0158469 A1 | 6/2014 | Bisig et al. |
| 2014/0212236 A1 | 7/2014 | Veittinger |
| 2014/0271156 A1 | 9/2014 | Suetrong et al. |
| 2014/0332003 A1 | 11/2014 | Crumblin et al. |
| 2014/0342441 A1 | 11/2014 | Yu et al. |
| 2017/0153103 A1* | 6/2017 | Dzieciol ............... G01B 5/14 |

FOREIGN PATENT DOCUMENTS

| | | |
|---|---|---|
| EP | 0 090 034 A1 | 10/1983 |
| EP | 0 105 979 A1 | 4/1984 |
| EP | 0 119 268 A1 | 9/1984 |
| EP | 0 143 728 A1 | 9/1984 |
| EP | 0 105 979 B1 | 6/1986 |
| EP | 0 200 689 A2 | 11/1986 |
| EP | 0 079 573 B1 | 4/1987 |
| EP | 0 227 773 A2 | 3/1988 |
| EP | 0 293 800 A2 | 12/1988 |
| EP | 0 257 773 A3 | 3/1989 |
| EP | 0 143 728 B1 | 4/1989 |
| EP | 0 200 689 A3 | 5/1989 |
| EP | 0 039 621 B1 | 10/1989 |
| EP | 0 320 600 A3 | 1/1990 |
| EP | 0 385 367 A1 | 9/1990 |
| EP | 0 388 438 A1 | 9/1990 |
| EP | 0 389 534 A1 | 10/1990 |
| EP | 0 419 336 A1 | 3/1991 |
| EP | 0 264 420 B1 | 10/1991 |
| EP | 0 482 380 A2 | 4/1992 |
| EP | 0 508 535 A1 | 10/1992 |
| EP | 0 293 800 B1 | 11/1992 |
| EP | 0 563 723 A1 | 10/1993 |
| EP | 0 572 754 A1 | 12/1993 |
| EP | 0 419 336 B1 | 12/1994 |
| EP | 0 493 142 B1 | 3/1995 |
| EP | 0 508 535 B1 | 2/1996 |
| EP | 0 715 299 A2 | 6/1996 |
| EP | 0 740 594 A1 | 11/1996 |
| EP | 0 630 442 B1 | 12/1996 |
| EP | 0 744 930 A1 | 12/1996 |
| EP | 0 763 184 A1 | 3/1997 |
| EP | 0 763 300 A1 | 3/1997 |
| EP | 0 777 851 A1 | 6/1997 |
| EP | 0 809 464 A1 | 12/1997 |
| EP | 0 818 122 A1 | 1/1998 |
| EP | 0 819 334 A1 | 1/1998 |
| EP | 0 857 163 A1 | 8/1998 |
| EP | 0 866 910 A1 | 9/1998 |
| EP | 0 880 337 A1 | 12/1998 |
| EP | 0 931 259 A2 | 7/1999 |
| EP | 0 931 584 A1 | 7/1999 |
| EP | 0 934 096 A1 | 8/1999 |
| EP | 0 994 775 A1 | 4/2000 |
| EP | 1 009 278 A1 | 6/2000 |
| EP | 1 009 614 A1 | 6/2000 |
| EP | 1 009 916 A1 | 6/2000 |
| EP | 1 012 508 A1 | 6/2000 |
| EP | 1 021 794 A1 | 7/2000 |
| EP | 1 055 282 A1 | 11/2000 |
| EP | 1 055 756 A2 | 11/2000 |
| EP | 1 067 986 A1 | 1/2001 |
| EP | 1 067 987 A1 | 1/2001 |
| EP | 1 067 989 A1 | 1/2001 |
| EP | 1 080 231 A1 | 3/2001 |
| EP | 1 084 508 A2 | 3/2001 |
| EP | 1 088 158 A1 | 4/2001 |
| EP | 1 089 791 A1 | 4/2001 |
| EP | 1 095 207 A2 | 5/2001 |
| EP | 1 141 522 A2 | 10/2001 |
| EP | 0 862 702 B1 | 3/2002 |
| EP | 1 213 997 A1 | 6/2002 |
| EP | 1 055 756 A3 | 11/2002 |
| EP | 1 268 979 A2 | 1/2003 |
| EP | 1 335 054 A2 | 8/2003 |
| EP | 1 335 054 A3 | 9/2003 |

(56) References Cited

FOREIGN PATENT DOCUMENTS

| | | |
|---|---|---|
| EP | 1 389 977 A2 | 2/2004 |
| EP | 0 931 584 B1 | 4/2004 |
| EP | 1 345 686 B1 | 6/2004 |
| EP | 1 432 553 A2 | 6/2004 |
| EP | 1 472 434 A2 | 11/2004 |
| EP | 1 491 143 A1 | 12/2004 |
| EP | 1 499 247 A1 | 1/2005 |
| EP | 1 213 997 B1 | 6/2005 |
| EP | 0 910 231 B1 | 7/2005 |
| EP | 1 194 069 A1 | 3/2006 |
| EP | 1 141 522 B1 | 6/2006 |
| EP | 1 668 226 A2 | 6/2006 |
| EP | 1 307 690 B1 | 10/2006 |
| EP | 1 711 685 A2 | 10/2006 |
| EP | 1 335 054 B1 | 2/2007 |
| EP | 1 787 090 A2 | 5/2007 |
| EP | 1 865 875 A2 | 12/2007 |
| EP | 1 989 020 A1 | 11/2008 |
| EP | 1 055 756 B1 | 3/2009 |
| EP | 1 571 425 B1 | 3/2009 |
| EP | 1 989 020 B1 | 8/2009 |
| EP | 2 123 904 A1 | 11/2009 |
| EP | 2 158 466 A1 | 3/2010 |
| EP | 2 183 504 A1 | 5/2010 |
| EP | 2 245 469 A1 | 11/2010 |
| EP | 2 330 295 A2 | 6/2011 |
| EP | 2 245 469 B1 | 7/2011 |
| EP | 2 386 136 A1 | 11/2011 |
| EP | 2 478 185 A1 | 7/2012 |
| EP | 2 495 379 A1 | 9/2012 |
| EP | 2 496 095 A2 | 9/2012 |
| EP | 2 534 438 A2 | 12/2012 |
| EP | 2 542 707 A1 | 1/2013 |
| EP | 2 588 860 a2 | 5/2013 |
| EP | 2 646 124 A1 | 10/2013 |
| EP | 2 697 080 A2 | 2/2014 |
| EP | 2 707 719 A2 | 3/2014 |
| EP | 2 745 050 A1 | 6/2014 |
| EP | 1 853 794 B1 | 7/2014 |
| WO | WO 1983/001353 A1 | 4/1983 |
| WO | WO 1984/001188 A1 | 3/1984 |
| WO | WO 1985/001850 A1 | 4/1985 |
| WO | WO 1986/004054 A1 | 7/1986 |
| WO | WO 1987/006323 A1 | 10/1987 |
| WO | WO 1988/001415 A1 | 2/1988 |
| WO | WO 1988/002866 A1 | 4/1988 |
| WO | WO 1988/009152 A1 | 12/1988 |
| WO | WO 1989/002060 A1 | 3/1989 |
| WO | WO 1989/003951 A1 | 5/1989 |
| WO | WO 1989/004093 A1 | 5/1989 |
| WO | WO 1989/004497 A1 | 5/1989 |
| WO | WO 1989/005401 A1 | 6/1989 |
| WO | WO 1991/000988 A1 | 1/1991 |
| WO | WO 1992/019851 A2 | 11/1992 |
| WO | WO 1993/02600 A2 | 10/1993 |
| WO | WO 1995/010396 A1 | 4/1995 |
| WO | WO 1995/021593 A1 | 8/1995 |
| WO | WO 1995/026094 A1 | 9/1995 |
| WO | WO 1995/033180 A1 | 12/1995 |
| WO | WO 1996/031938 A1 | 1/1996 |
| WO | WO 1996/006330 A1 | 2/1996 |
| WO | WO 1996/025093 A1 | 8/1996 |
| WO | WO 1996/025094 A1 | 8/1996 |
| WO | WO 1996/025095 A1 | 8/1996 |
| WO | WO 1996/025096 A1 | 8/1996 |
| WO | WO 1996/025097 A1 | 8/1996 |
| WO | WO 1996/031086 A1 | 10/1996 |
| WO | WO 1996/034781 A1 | 11/1996 |
| WO | WO 1997/012237 A1 | 4/1997 |
| WO | WO 1997/015533 A1 | 5/1997 |
| WO | WO 1997/021903 A1 | 6/1997 |
| WO | WO 1997/028734 A1 | 8/1997 |
| WO | WO 1998/014738 A1 | 4/1998 |
| WO | WO 1998/015825 A2 | 4/1998 |
| WO | WO 1998/017345 A1 | 4/1998 |
| WO | WO 1998/033622 A1 | 8/1998 |
| WO | WO 1998/037312 A1 | 8/1998 |
| WO | WO 1998/056566 A1 | 12/1998 |
| WO | WO 1999/000251 A1 | 1/1999 |
| WO | WO 1999/002340 A1 | 1/1999 |
| WO | WO 1999/004368 A1 | 1/1999 |
| WO | WO 1999/025070 A1 | 5/1999 |
| WO | WO 1999/011174 A1 | 7/1999 |
| WO | WO 1999/036940 A2 | 7/1999 |
| WO | WO 1999/037017 A1 | 7/1999 |
| WO | WO 1999/045633 A1 | 9/1999 |
| WO | WO 1999/050706 A1 | 10/1999 |
| WO | WO 1999/051301 A1 | 10/1999 |
| WO | WO 1999/051302 A1 | 10/1999 |
| WO | WO 16668051303 A1 | 10/1999 |
| WO | WO 1999/060169 A1 | 11/1999 |
| WO | WO 1999/066187 A1 | 12/1999 |
| WO | WO 1999/066985 A1 | 12/1999 |
| WO | WO 2000/003124 A2 | 1/2000 |
| WO | WO 2000/038985 A2 | 7/2000 |
| WO | WO 2001/021075 A1 | 3/2001 |
| WO | WO 2001/075273 A2 | 10/2001 |
| WO | WO 2002/009396 A2 | 1/2002 |
| WO | WO 2002/009840 A1 | 2/2002 |
| WO | WO 2002/087656 A2 | 11/2002 |
| WO | WO 2002/090041 A1 | 11/2002 |
| WO | WO 2003/003509 A1 | 1/2003 |
| WO | WO 2003/006213 A2 | 1/2003 |
| WO | WO 2003/014036 A1 | 2/2003 |
| WO | WO 2003/067030 A2 | 8/2003 |
| WO | WO 2003/088851 A1 | 10/2003 |
| WO | WO 2005/019332 A1 | 3/2005 |
| WO | WO 2005/021936 A2 | 3/2005 |
| WO | WO 2005/024171 A2 | 3/2005 |
| WO | WO 2005/073513 A2 | 8/2005 |
| WO | WO 2005/074569 A2 | 8/2005 |
| WO | WO 2005/079816 A2 | 9/2005 |
| WO | WO 2005/108012 A2 | 11/2005 |
| WO | WO 2005/114495 A1 | 12/2005 |
| WO | WO 2006/021808 A2 | 3/2006 |
| WO | WO 2006/021808 A3 | 8/2006 |
| WO | WO 2006/104098 A1 | 10/2006 |
| WO | WO 2006/105476 A2 | 10/2006 |
| WO | WO 2006/121818 A2 | 11/2006 |
| WO | WO 2007/047993 A2 | 4/2007 |
| WO | WO 2007/093606 A1 | 8/2007 |
| WO | WO 2008/046133 A1 | 4/2008 |
| WO | WO 2008/056196 A1 | 5/2008 |
| WO | WO 2008/154983 A1 | 12/2008 |
| WO | WO 2009/009350 A2 | 1/2009 |
| WO | WO 2009/009350 A3 | 2/2009 |
| WO | WO 2009/020397 A1 | 2/2009 |
| WO | WO 2009/009350 A4 | 4/2009 |
| WO | WO 2009/100885 A1 | 8/2009 |
| WO | WO 2009/114375 A2 | 9/2009 |
| WO | WO 2010/051006 A1 | 5/2010 |
| WO | WO 2010/079424 A1 | 7/2010 |
| WO | WO 2010/085233 A1 | 7/2010 |
| WO | WO 20120/079424 A9 | 7/2010 |
| WO | WO 2010/104546 A1 | 9/2010 |
| WO | WO 2010/132960 A1 | 11/2010 |
| WO | WO 2010/134708 A2 | 11/2010 |
| WO | WO 2010/134708 A3 | 2/2011 |
| WO | WO 2011/067449 A1 | 6/2011 |
| WO | WO 2011/078916 A2 | 6/2011 |
| WO | WO 2011/100053 A2 | 8/2011 |
| WO | WO 2011/107869 A1 | 9/2011 |
| WO | WO 2012/003348 A2 | 1/2012 |
| WO | WO 2011/107869 A8 | 5/2012 |
| WO | WO 2012/072979 A1 | 6/2012 |
| WO | WO 2012/091821 A1 | 7/2012 |
| WO | WO 2012/142120 A2 | 10/2012 |
| WO | WO 2012/151501 A2 | 11/2012 |
| WO | WO 2012/168683 A2 | 12/2012 |
| WO | WO2013/025208 A1 | 2/2013 |
| WO | WO 2013/161390 A1 | 10/2013 |
| WO | WO 20013/171728 A2 | 11/2013 |
| WO | WO 2014/121293 A1 | 8/2014 |

(56) References Cited

FOREIGN PATENT DOCUMENTS

| | | |
|---|---|---|
| WO | WO 2014/145018 A2 | 9/2014 |
| WO | WO 2014/155274 A1 | 10/2014 |
| WO | WO 2014/174543 A2 | 10/2014 |

* cited by examiner

GAP MEASURING DEVICE

FIELD OF THE INVENTION

This invention relates generally to devices for measuring a gap between two objects, and more particularly to a device for measuring the gap between a stator and a rotor of a turbine.

BACKGROUND OF THE INVENTION

When assembling a turbine, detailed measurements of concentricity deviation of the stator and rotor are typically taken during installation in an effort to ensure proper alignment of the stator with the rotor. This process can be time consuming and ultimately may require use of a crane to repeatedly remove the upper half of the stator to perform measurements using lead wire, i.e., measuring the rotor's deformation under the load of the upper half of the stator to ensure proper alignment.

BRIEF SUMMARY OF THE INVENTION

One aspect of the disclosed technology relates to a device for measuring the distance between two objects located remotely from an operator.

Another aspect of the disclosed technology relates to a device for measuring the distance between a rotor and a stator of a turbine at a position remote from an operator.

One exemplary but nonlimiting aspect of the disclosed technology relates to a device for measuring a distance between two objects comprising: a base including an upper surface and a lower surface, the upper surface being disposed at an incline to the lower surface; a wedge having a top surface and a bottom surface, the bottom surface being arranged to slidably engage the upper surface of the base, the bottom surface being disposed at an incline that matches the incline of the upper surface such that the top surface of the wedge and the lower surface of the base are disposed parallelly to one another; and a flexible actuator having a first end coupled to the wedge such that a force applied to a second end of the flexible actuator causes the bottom surface of the wedge to slide relative to the upper surface of the base thereby causing a distance change between the parallelly disposed top surface of the wedge and lower surface of the base.

Another exemplary but nonlimiting aspect of the disclosed technology relates to a method of measuring a gap between a rotor and a stator in a turbine, comprising: inserting the base and the wedge of the device into the gap between the rotor and the stator; with the flexible actuator, pushing the base and the wedge to a desired location in the gap while maintaining the second end of the flexible actuator exposed from the gap; and exerting a force on the second end of the flexible actuator thereby causing the top surface of the wedge to engage the rotor and the lower surface of the base to engage the stator.

Other aspects, features, and advantages of this technology will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various examples of this technology. In such drawings.

DETAILED DESCRIPTION OF THE ILLUSTRATED EMBODIMENTS

Figure 1:
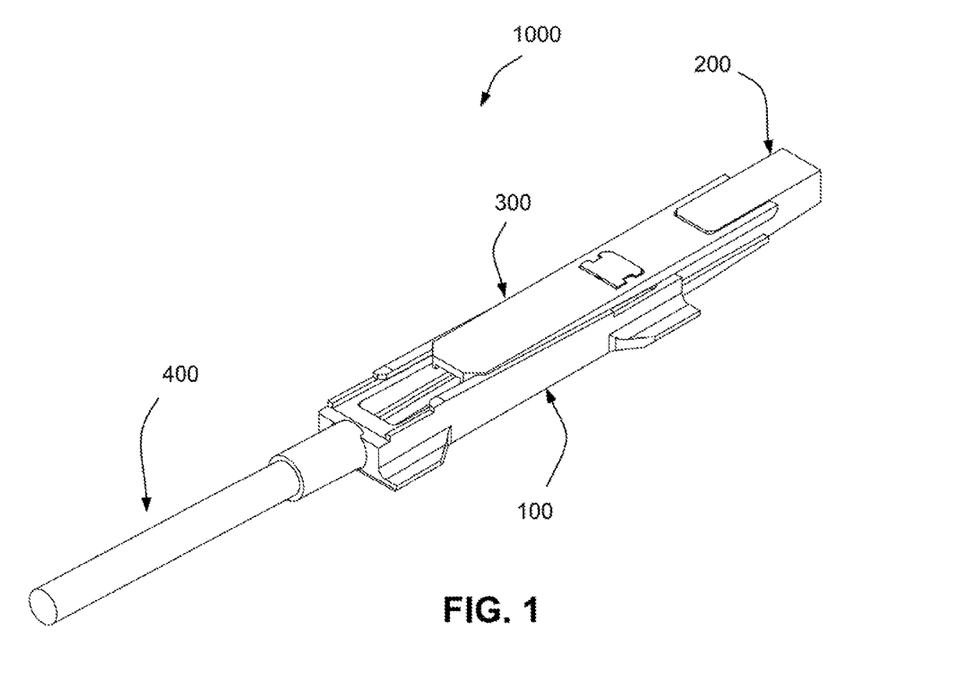
FIG. 1 is a perspective view of a gap measuring device according to an example of the disclosed technology.
Figure 2:
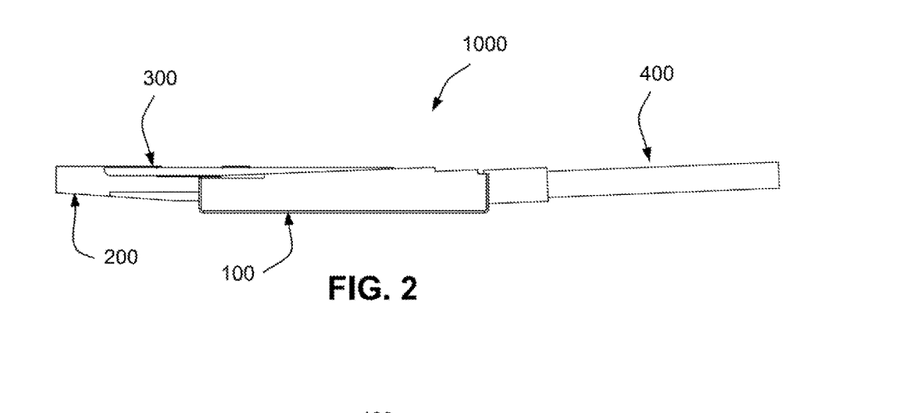
FIG. 2 is a side view of the gap measuring device of FIG. 1.
Figure 3:
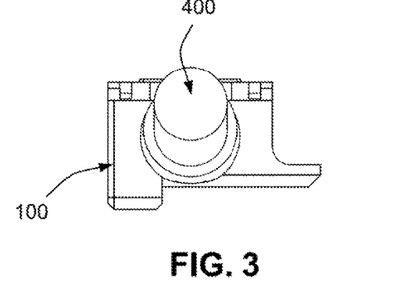
FIG. 3 is a rear view of the gap measuring device of FIG. 1.

Referring to FIG. 1, a gap measuring device 1000 is shown. The gap measuring device can be used to measure a gap between two objects disposed at a location remote from an operator. For example, as will be described in detail later, the gap measuring device 1000 can be used to measure the gap between the rotor and the stator (diaphragm) of a turbine (e.g., gas or steam).

As shown in FIGS. 1-5, gap measuring device 1000 includes a base 100, a slider 200, a wedge 300 and an actuator 400 (e.g., flexible actuator). The slider 200 is slidably received in the base 100. The wedge 300 has a bottom surface that is angled to match the incline of an upper surface of the base. The wedge 300 is connected to the slider 200 in a manner that allows relative vertical movement. The connection between the wedge 300 and the slider 200, however, disallows relative movement in the longitudinal direction in which the slider slides within the base 100. The actuator 400 can be used to exert a force on the slider 200 causing the slider to slide longitudinally relative to the base, thereby causing the edge 300 to also slide relative to the base while moving vertically relative to the slider 200.

Figure 5:
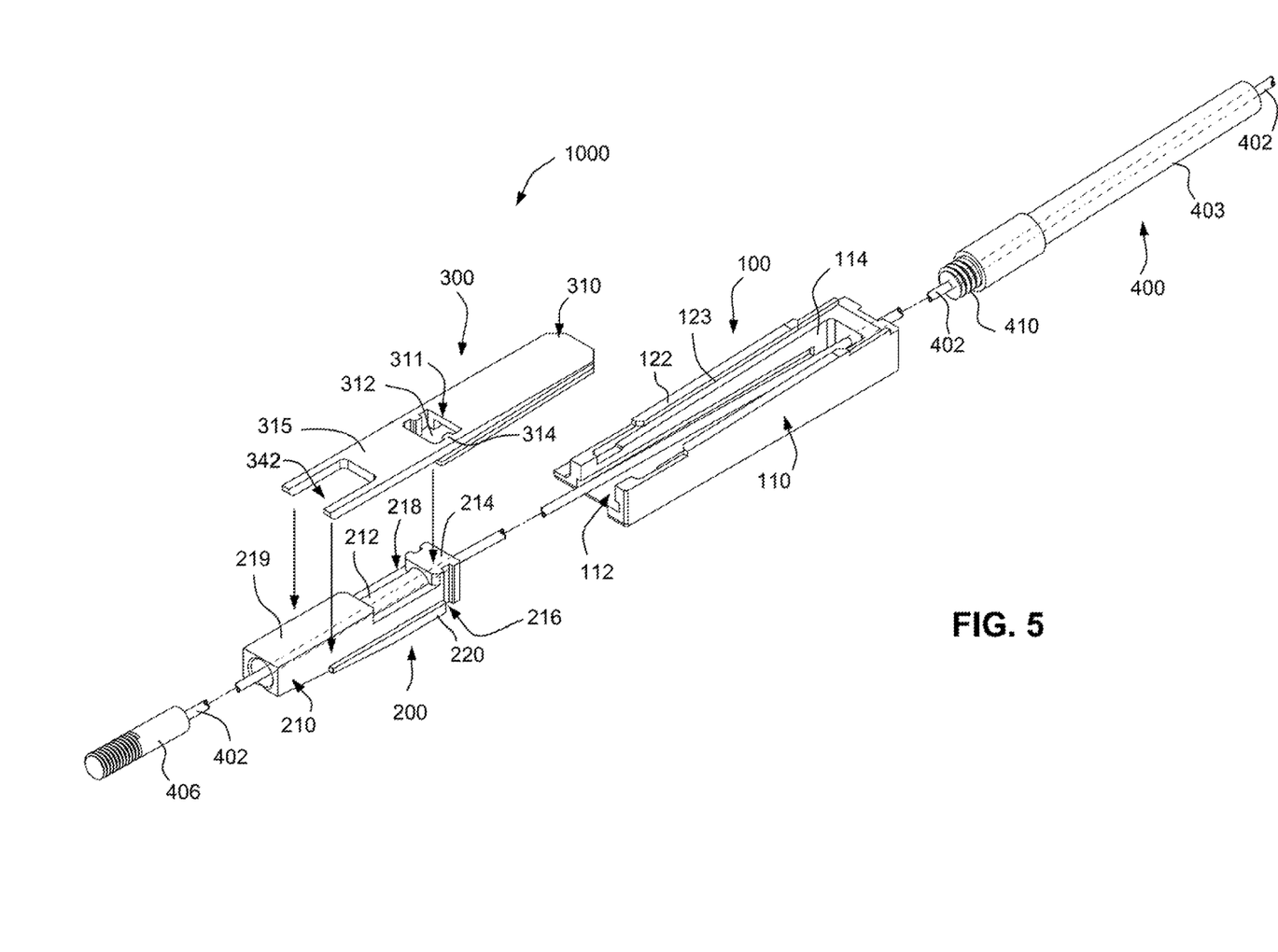
FIG. 5 is an exploded perspective view of the gap measuring device of FIG. 1.
Figures 6, 7:
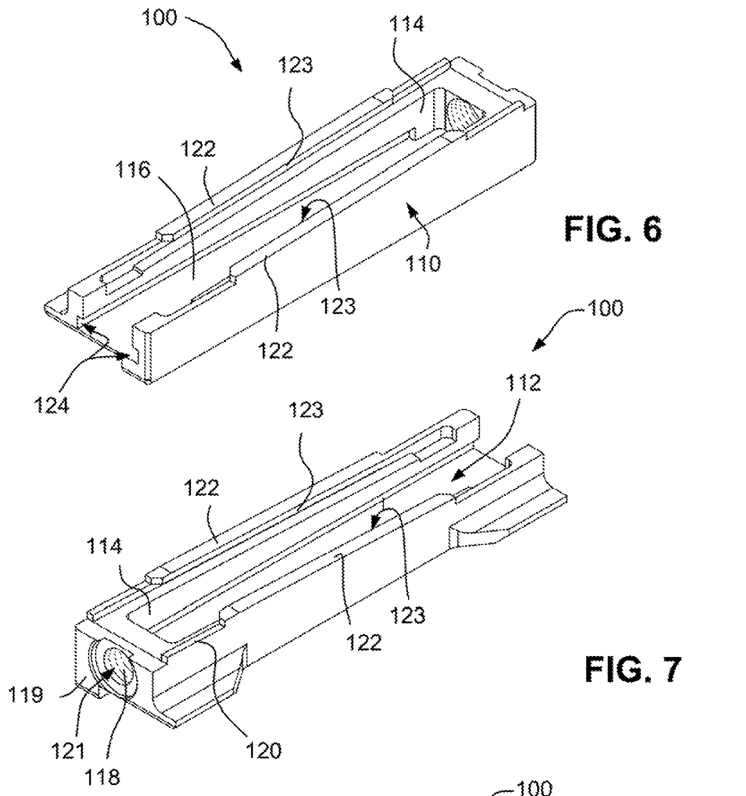
FIG. 6 is a front side perspective view of a base of the gap measuring device of FIG. 1.
FIG. 7 is a rear side perspective view of the base of FIG. 6.

The base 100 includes a main portion 110, as best shown in FIGS. 5-7. A pair of opposing sidewalls 114 extends in a longitudinal direction of the base. A floor 116 connects the sidewalls 14 and also extends in the longitudinal direction. As shown in FIG. 7, a front wall 119 of the base connects the sidewalls and has an opening 118 formed therein. The sidewalls 114, the floor 116 and the front wall 119 define a cavity 112.

As can be seen in FIGS. 5-7, the base includes an upper surface 122 supported by the sidewalls 114. A pair of guide rails 123 protrudes from the sidewalls 114. Below the guide rails 123, a pair of sliding grooves 124 are formed in the sidewalls 114, as best shown in FIG. 6.

Figure 8:
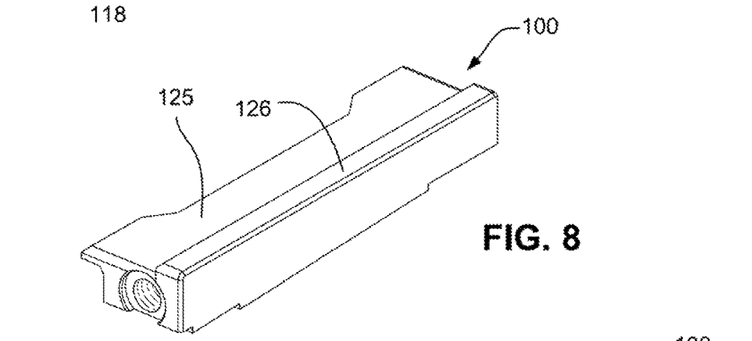
FIG. 8 is a bottom side perspective view of the base of FIG. 6.
Figure 9:
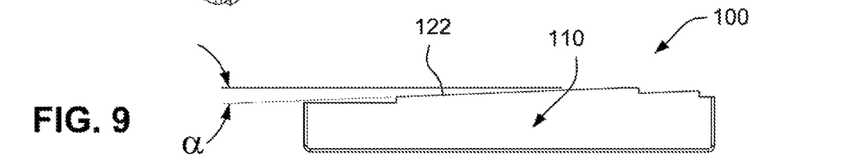
FIG. 9 is a side view of the base of FIG. 6.

Turning to FIG. 8, a bottom side of the base includes a lower surface 125 and a step 126 which extends below lower surface 125. FIG. 9 illustrates that the upper surface 122 and guide rails 123 of the base 100 are inclined with respect to the lower surface 125 (which extends horizontally) by an angle $\alpha$.

Figure 10:
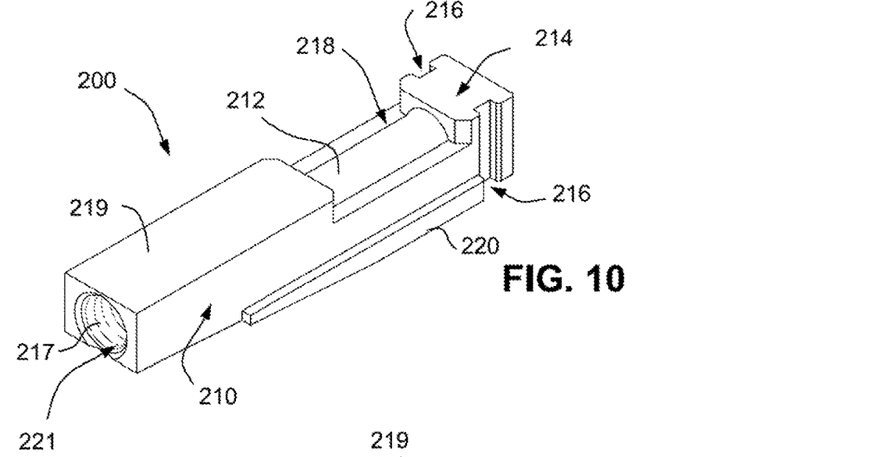
FIG. 10 is a front side perspective view of a slider of the gap measuring device of FIG. 1.
Figure 11:
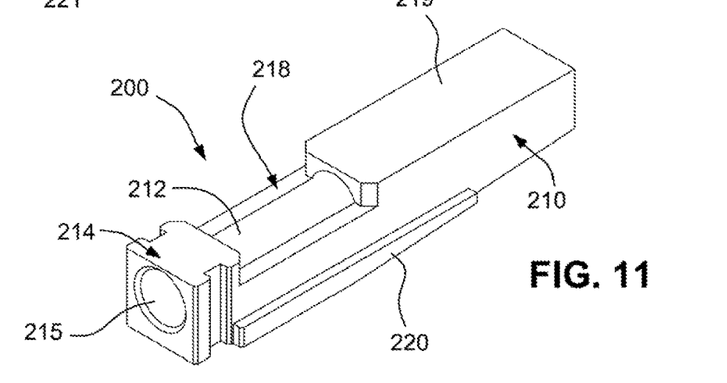
FIG. 11 is a rear side perspective view of the slider of FIG. 11.
Figure 12:
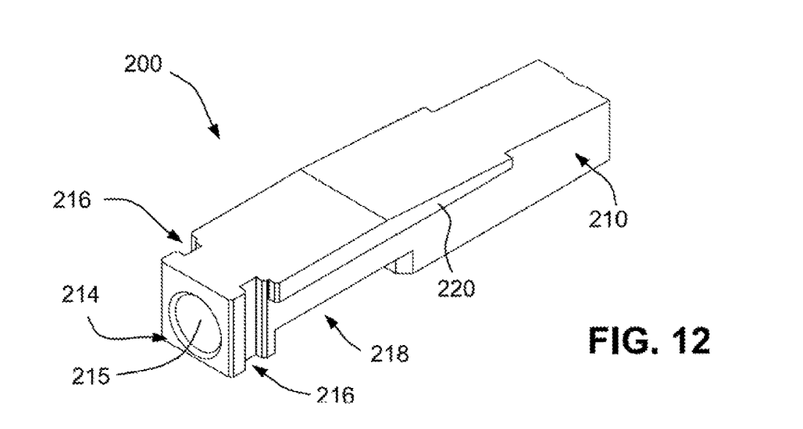
FIG. 12 is a bottom side perspective view of the slider of FIG. 11.

Referring to FIGS. 5 and 10-12, slider 200 comprises a body portion 210 having a hollow portion 212 (e.g., bore) formed therein. A connecting structure 214 is formed at a first end of the slider. Connecting structure 214 includes opposing channels (e.g., recesses) formed therein so as to extend in a vertical direction of the body portion 210. At a first end face of the slider 200, a first opening 215 is formed in the connecting structure 214, as best shown in FIGS. 11 and 12. A rearward section 219 of the body portion extends to a second end face of the slider 200 where a second opening 217 is formed.

A reduced-height section 218 is disposed between the connecting structure 214 and the rearward section 219, as shown in FIG. 10. The reduced-height section 218 is recessed relative to the upper surfaces of the connecting structure 214 and the rearward section 219.

Figure 4:
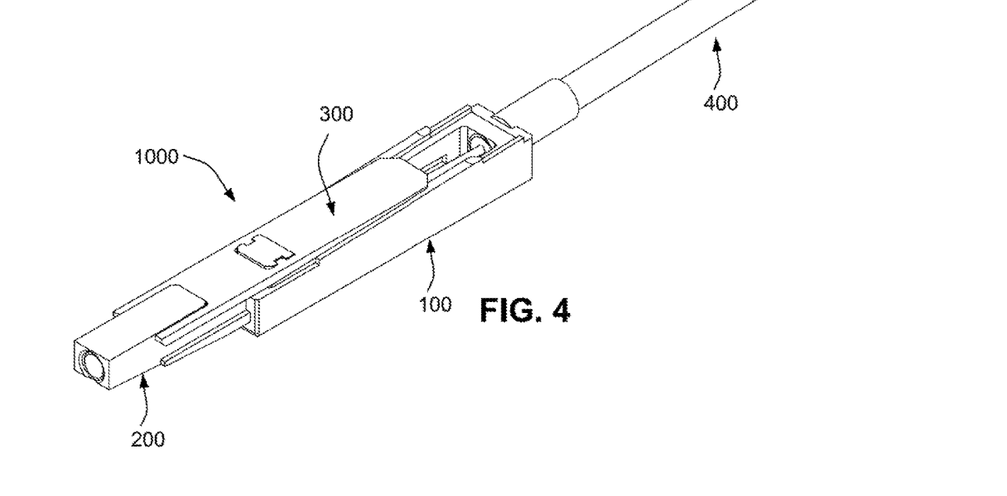
FIG. 4 is another perspective view of the gap measuring device according to FIG. 1.

Referring to FIGS. 10-12, the body portion 210 has protrusions 220 extending outwardly from opposite sides thereof. The protrusions 220 extend along the body portion 210 in the longitudinal direction of the slider 200. The protrusions 220 are configured to be slidably received in the sliding grooves 124 of the base 100, as best shown in FIGS. 4, 6 and 10.

Figure 13:
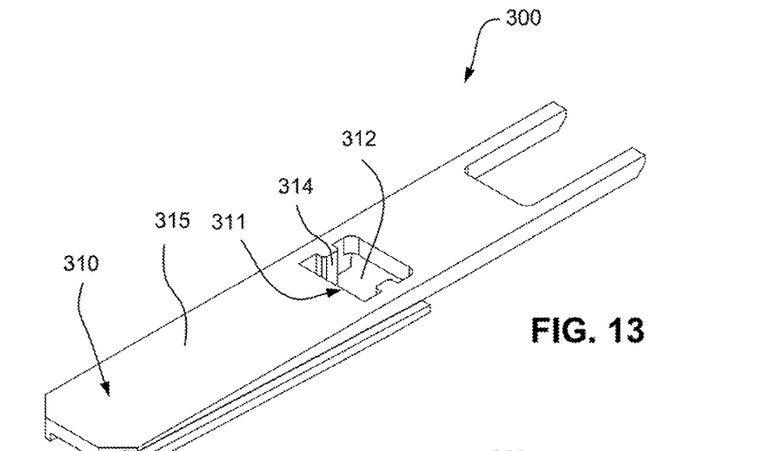
FIG. 13 is a top side perspective view of a wedge of the gap measuring device of FIG. 1.
Figure 14:
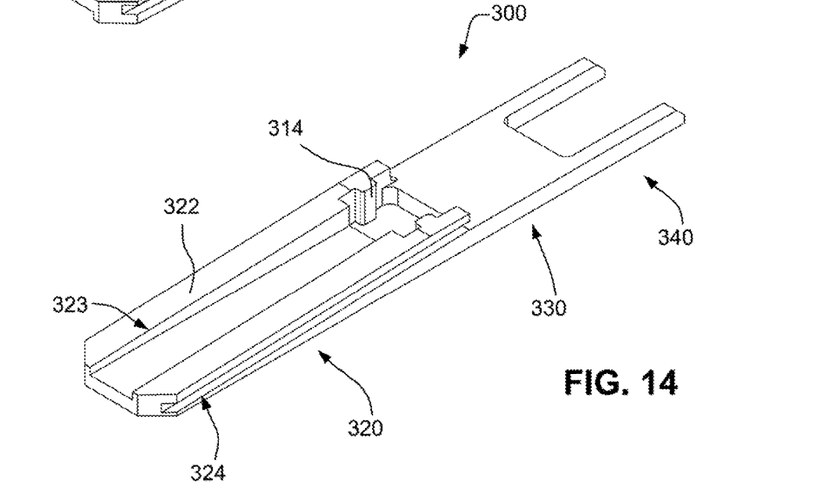
FIG. 14 is a bottom side perspective view of the wedge of FIG. 13.

Turning to FIGS. 5 and 13-15, the wedge 300 has a body 310 comprising a front portion 320, an intermediate portion 330 and a back portion 340. The front portion 320 includes a guide element 323 that slidingly engages the guide rails 123 of the base 100. The guide element 323 has a bottom surface 322 and opposing grooves 324 formed therein between the bottom surface 322 and a top surface 315 of the wedge, as best shown in FIGS. 13 and 14.

The front portion 320 also includes an attachment structure 311 configured to slidingly engage the connecting structure 214 of the slider 200, as best shown in FIG. 5. The attachment structure 311 includes an opening 312 formed through the wedge 300 and projecting portions 314 extending into the opening. The projecting portions 314 extend vertically along the opening 312 from the top surface 315 to the bottom surface 322 of the wedge, as best shown in FIGS. 13 and 14. Turning back to FIG. 5, the projecting portions 314 are configured to slidingly engage channels 216 formed in the connecting structure 214 of the slider 200 to allow relative vertical motion between the slider 200 and the wedge 300. That, is, the wedge 300 is configured to move relative to the slider 200 in a direction substantially perpendicular to the top surface 315 of the wedge.

Referring to FIG. 14, the intermediate portion 330 of the wedge is recessed relative to bottom surface 322 of the front portion 320. The intermediate portion 330 is positioned above the reduced-height section 218 of the slider 200 and provides space between the intermediate portion 330 and the reduced-height section 218 to allow for installation of the wedge 300 on the slider 200 (via connecting structure 214) and relative motion therebetween, as best shown in FIGS. 1 and 5.

Referring to FIGS. 13 and 14, the back portion 340 of the wedge includes a cutout 342. As best shown in FIGS. 4 and 5, the cutout 342 receives the rearward portion 219 of the slider 200 such that the rearward portion moves through the cutout when the wedge 300 moves relative to the slider.

Figure 15:
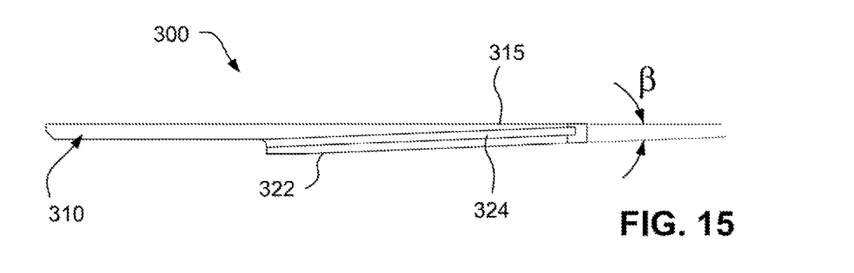
FIG. 15 is a side view of the wedge of FIG. 13.
Figure 16:
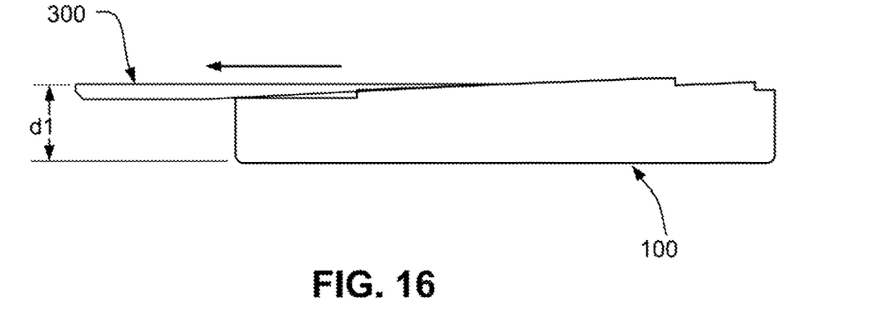
FIG. 16 is a schematic representation of the wedge in a retracted position relative to the base according to an example of the disclosed technology.
Figure 17:
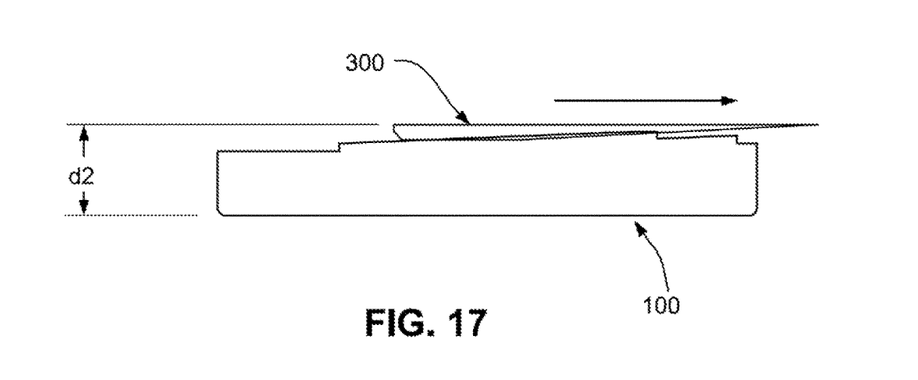
FIG. 17 is a schematic representation of the wedge in a forward position relative to the base according to an example of the disclosed technology.

Turning to FIG. 15, the bottom surface 322 and grooves 324 of the wedge 300 are inclined with respect to the top surface 315 at an angle $\beta$, which is equal to the angle $\alpha$ of the upper surface 122 and guide rails 123 of the base. The top surface 315 of the wedge extends in parallel with the lower surface 125 of the base. Thus, as guide rails 123 slide within grooves 324, the distance between the top surface 315 of the wedge 300 and the lower surface 125 of the base changes, as shown in FIGS. 16 and 17. Still referring to FIGS. 16 and 17, the distance change may be represented as the difference between d1 and d2.

Figure 18:
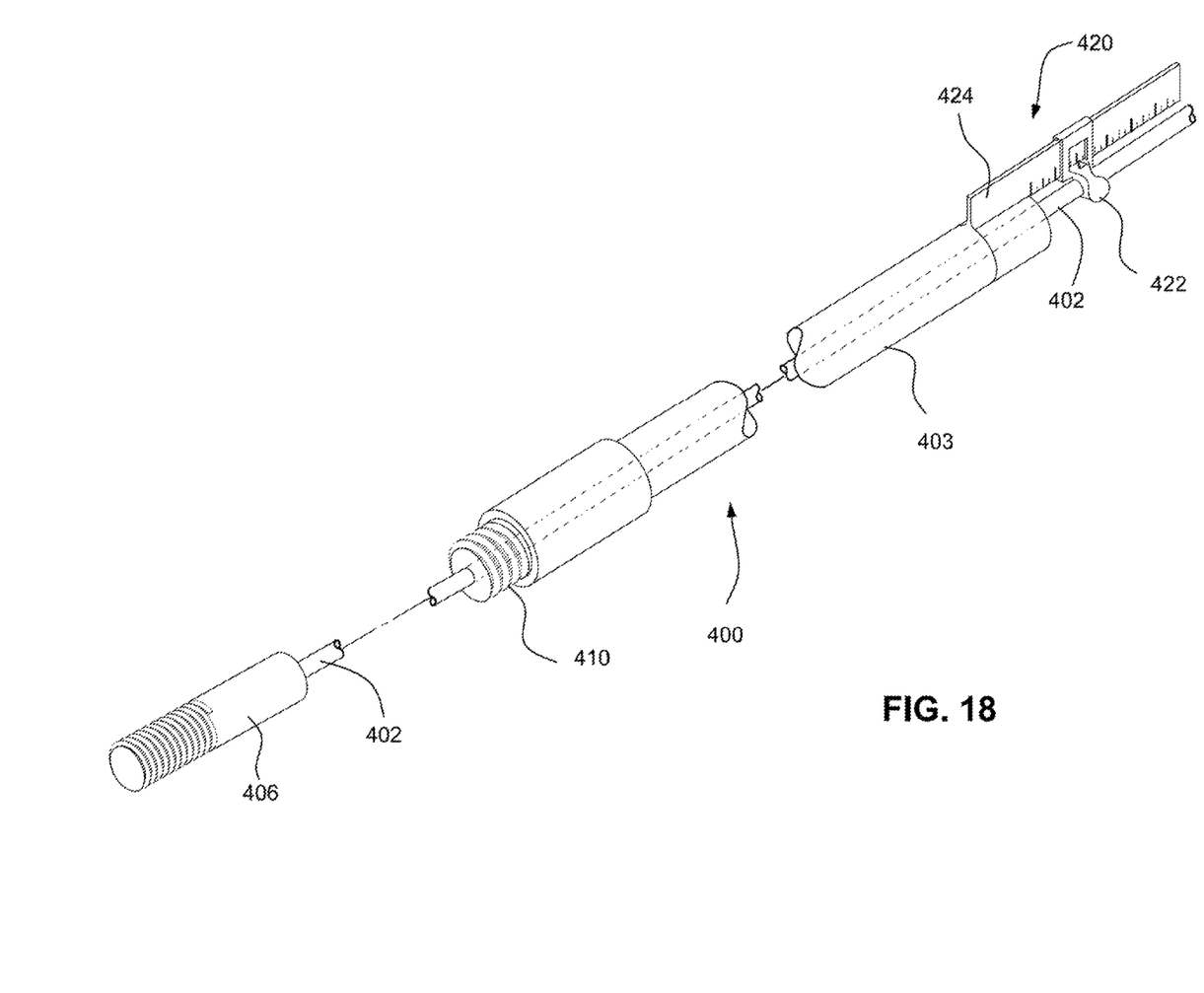
FIG. 18 is a perspective view of an actuator of the gap measuring device of FIG. 1.

Actuator 400 may be a flexible push-pull cable as those skilled in the art will understand. The actuator 400 includes an inner cable 402 enclosed by an outer casing or, jacket 403, as shown in FIGS. 5 and 18. The inner cable 402 is slidably received within the outer casing 403. A proximal end of the inner cable 402 is attached to connecting structure 406 which is detachably connected to the slider 200. In the illustrated example, the connecting structure 406 includes threads for a threaded connection with the bore 217 of the slider (via threads 221 in slider 200), as best shown in FIGS. 5 and 10. However, any suitable connection may be used.

Referring to FIGS. 5, 7 and 18, the outer casing 403 includes connecting structure 410 to connect the actuator 400 to the base 100 via opening 118 in the base, in the illustrated example, the connecting structure 410 includes threads for a threaded connection with the base (via threads 121 in the base 100 at opening 118), as best shown in FIGS. 5-8. However, any suitable connection may be used.

A distal portion of the actuator 400 includes a measuring device 420, as shown in FIG. 18. The measuring device includes a sliding indicator 422 and a measuring scale 424. The inner cable 402 is attached to the sliding indicator 422 and the sliding indicator is arranged to slide along the measuring scale. Any other suitable manner of attaching the sliding indicator to the inner cable may also be used.

Still referring to FIG. 18, the outer casing 403 is attached to the measuring scale. In this manner, a user can apply a force to the inner cable 402 which will in turn exert a force on the slider 200. The distance that the inner cable 402 travels will be indicated by the distance that the sliding indicator 422 moves along the measuring scale 424. The measuring device 420 may also include a Vernier scale. Those skilled in the art will recognize that a micrometer could also be used as a measuring device. Any other suitable measurement device may also be used, e.g., the distance between the sliding indicator 422 and an end portion of the outer casing 403 could be measured using gauge blocks.

The distance traveled by the inner cable 402 will correspond to the distance that the slider 200 moves with respect to the base 100. Since the slider 200 and the wedge 300 are connected, as described above, the wedge 300 will move the same distance that the slider moves relative to the base 100. A coil spring may be disposed in the base 100 to cause the inner cable 402 to return once the force is no longer applied.

As the slider 200 slides into the base 100, the top surface 315 of the wedge moves vertically relative to the parallelly disposed lower surface 125 of the base, due to the angled bottom surface 322 and grooves 324 of the wedge and the angled upper surface 122 and guide rails 123 of the base. Since the angle β of the bottom surface 322 and grooves 324 is a known predetermined angle, the angle β can be used along with the measured distance traveled by the wedge 300 to determine the distance change between the top surface 315 of the wedge and the lower surface 125 of the base, as those skilled in the art will understand.

Figure 19:
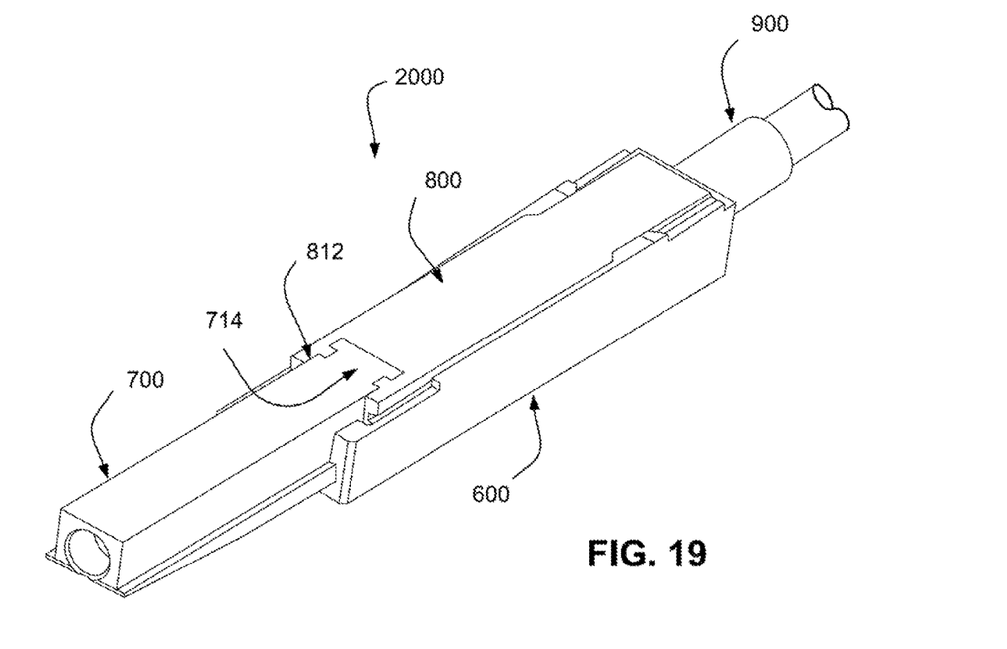
FIG. 19 is a perspective view of a gap measuring device according to another example of the disclosed technology.

Referring to FIG. 19, another gap measuring device 2000 is shown. Gap measuring device 2000 includes base 600, slider 700, wedge 800, and actuator 900. In contrast to gap measuring device 1000, the connecting structure 714 of the slider and the opening 812 of the wedge may be formed at respective end portions of the slider and wedge.

Figure 20:
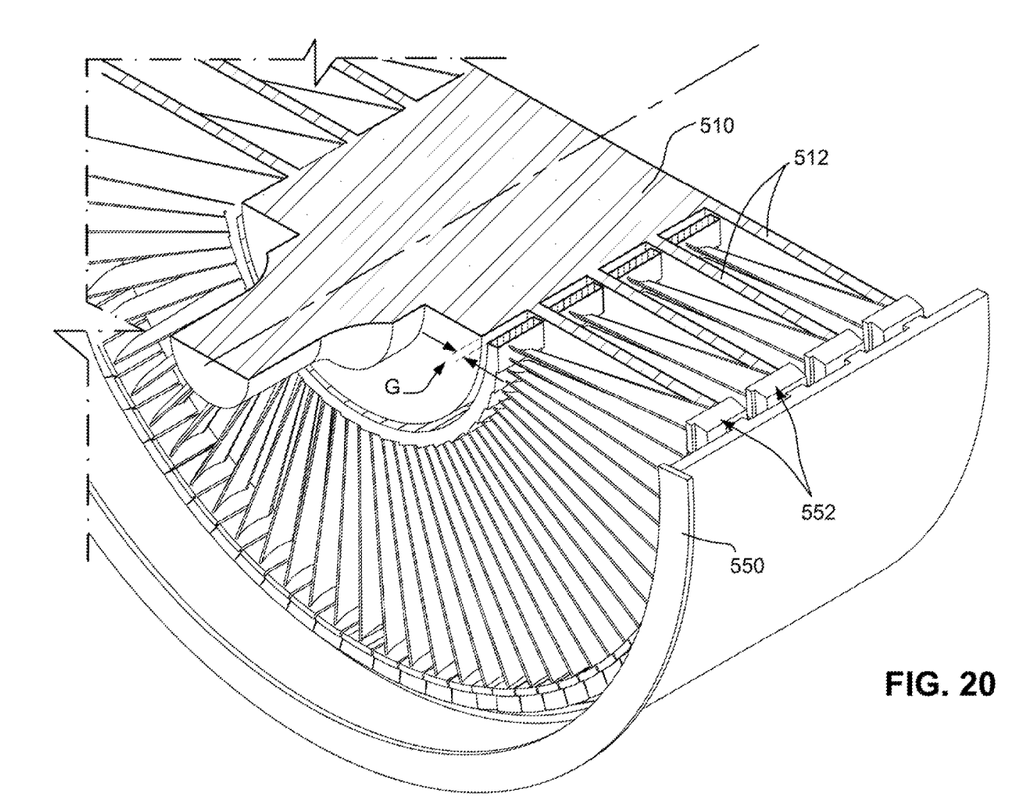
FIG. 20 is a partial perspective view of a partially assembly turbine according to an example of the disclosed technology.

Turning to FIG. 20, the rotor 510 and the lower half of a stator 550 of a turbine are shown. The rotor 510 includes rotor blades 512 and the stator 550 includes stator blades 552. The gap measuring device 1000, 2000 may be inserted into a gap G between a rotor 510 and the stator blades 552 while leaving the distal end of the actuator 400 exposed from the gap G.

The lower surface 125 of the base 100 and the step 126 of the base, as shown in FIG. 8, are configured to match the profile of the stator so as to slide along the stator to a desired measurement location in the gap. Of course, lower surface 125 and step 126 could have another configuration (e.g., the step could be removed), depending on the profile of the stator. When the cable 402 is pulled, the top surface 315 of the wedge will move into contact with the rotor. In this manner, a distance of the gap G between the rotor and the stator can be determined.

Multiple measurements may be taken around the annular configuration of the rotor to determine concentricity deviation. Utilizing the measurements, adjustments ma be made to the stator and/or rotor to ensure proper concentricity between the rotor and the stator.

It is noted that the gap measuring device can be used to measure the distance between objects linearly arranged or concentrically arranged.

While the invention has been described in connection with what is presently considered to be the most practical and preferred examples, it is to be understood that the invention is not to be limited to the disclosed examples, but on the contrary, is intended to cover various modifications and equivalent arrangements included within the spirit and scope of the appended claims.

What is claimed is:

1. A device for measuring a distance between two objects, comprising:
   a base including an upper surface and a lower surface, the upper surface being disposed at an incline to the lower surface;
   a wedge having a top surface and a bottom surface, the bottom surface being arranged to slidably engage the upper surface of the base, the bottom surface being disposed at an incline that matches the incline of the upper surface such that the top surface of the wedge and the lower surface of the base are disposed parallelly to one another; and
   a flexible actuator having a first end coupled to the wedge such that a force applied to a second end of the flexible actuator causes the bottom surface of the wedge to slide relative to the upper surface of the base thereby causing a distance change between the parallelly disposed top surface of the wedge and lower surface of the base,
   wherein the flexible actuator includes an inner cable slidably received within an outer casing, and
   wherein the force applied to the distal portion of the flexible actuator causes the inner cable to slide relative to the outer casing.

2. The device of claim 1, further comprising a slider slidably coupled to the base and slidably coupled to the wedge.

3. The device of claim 2, wherein the flexible actuator is coupled to the wedge through a direct connection with the slider via connector structure of the flexible actuator.

4. The device of claim 3, wherein the first end of the flexible actuator has a threaded connection with the slider.

5. The device of claim 3, wherein the slider has a hollow portion formed therein for receiving the connector structure.

6. The device of claim 2, wherein the slider has a connecting structure which connects with an attachment structure of the wedge to enable relative sliding movement between the slider and the wedge in a direction substantially perpendicular to the top surface of the wedge.

7. The device of claim 6, wherein the connecting structure of the slider has channels formed therein, and the attachment structure of the wedge has protrusions extending therefrom for sliding engagement with the channels.

8. The device of claim 1, wherein the wedge has a pair of sliding grooves formed therein, the sliding grooves being disposed on opposing sides of the wedge extending along the wedge in parallel with the bottom surface of the wedge.

9. The device of claim 8, wherein the base includes a pair of guide rails configured to slidingly support the sliding grooves on the wedge.

10. The device of claim 1, further comprising a slider slidably coupled to the base.

11. The device of claim 1, wherein the base has a cavity arranged to slidably receive the inner cable.

12. The device of claim 1, wherein the distal portion of the flexible actuator comprises a sliding indicator arranged to slide along a measuring scale such that movement of the inner cable relative to the outer casing can be determined.

13. The device of claim 12, wherein the flexible actuator has a threaded connection with the base.

14. A method of measuring a gap between a rotor and a stator in a turbine with a gap measuring device, the gap measuring device comprising a base including an upper surface and a lower surface such that the upper surface is disposed at an incline to the lower surface, a wedge having a top surface and a bottom surface such that the bottom surface is arranged to slidably engage the upper surface of the base wherein the bottom surface is disposed at an incline that matches the incline of the upper surface such that the top surface of the wedge and the lower surface of the base are disposed parallelly to one another, and a flexible actuator having a first end coupled to the wedge such that a force applied to a second end of the flexible actuator causes the bottom surface of the wedge to slide relative to the upper surface of the base thereby causing a distance change between the parallelly disposed top surface of the wedge and lower surface of the base, the method comprising:
   inserting the base and the wedge into the gap between the rotor and the stator;
   with the flexible actuator, pushing the base and the wedge to a desired location in the gap while maintaining the second end of the flexible actuator exposed from the gap; and exerting a force on the second end of the flexible actuator thereby causing the top surface of the wedge to engage the rotor and the lower surface of the base to engage the stator.

15. The method of claim 14, wherein the flexible actuator includes an inner cable slidably received within an outer casing, further comprising measuring a distance-traveled that the inner cable moves relative to the outer casing when the force is applied.

16. The method of claim 15, wherein the step of exerting a force on the second end of the flexible actuator causes a distance change between the parallelly disposed top surface of the wedge and lower surface of the base.

17. The method of claim 16, wherein the incline of the bottom surface of the wedge is a predetermined angle.

18. The method of claim 17, calculating the distance change using the predetermined angle and the distance-traveled.

19. The method of claim 18, wherein after the step of exerting a force on the second end of the flexible actuator, further comprising pushing the base and the wedge to another desired location in the gap.

20. The method of claim 19, further comprising correcting a position of the stator relative to the rotor using the calculated distance change.

* * * * *

UNITED STATES PATENT AND TRADEMARK OFFICE
CERTIFICATE OF CORRECTION

PATENT NO. : 10,030,961 B2
APPLICATION NO. : 14/953173
DATED : July 24, 2018
INVENTOR(S) : Dzieciol et al.

Page 1 of 1

It is certified that error appears in the above-identified patent and that said Letters Patent is hereby corrected as shown below:

In the Specification

Column 2, Line 66, change "edge" to --wedge--.

Column 4, Line 26, change "or," to --or--.

Column 4, Line 37, change "base, in" to --base. In--.

Signed and Sealed this
Sixth Day of November, 2018

Andrei Iancu
*Director of the United States Patent and Trademark Office*